United States Patent

Kröner et al.

[11] Patent Number: 5,587,404
[45] Date of Patent: Dec. 24, 1996

[54] GELS WITH THERMOTROPIC PROPERTIES

[75] Inventors: Hubertus Kröner, Neustadt; Ekkehard Jahns, Hirschberg; Manfred Mielke, Heidelberg, all of Germany

[73] Assignee: Basf Aktiengesellschaft, Ludwigshafen, Germany

[21] Appl. No.: 423,850

[22] Filed: Apr. 18, 1995

[30] Foreign Application Priority Data

Apr. 22, 1994 [DE] Germany ............. 44 14 088.6

[51] Int. Cl.$^6$ ................................. C08K 3/00
[52] U.S. Cl. ................. 522/85; 522/74; 522/79; 522/86; 522/149; 523/300; 524/529; 524/530; 524/533; 524/534; 524/535; 524/458; 524/460
[58] Field of Search ................. 524/458, 460, 524/528, 530, 529, 533, 535, 534; 522/6, 74, 79, 85, 149, 86; 523/300

[56] References Cited

U.S. PATENT DOCUMENTS

| 2,982,749 | 5/1961 | Friedrich et al. | 524/812 |
|---|---|---|---|
| 3,993,553 | 11/1976 | Assarsson et al. | 204/159.12 |
| 4,004,997 | 1/1977 | Tsukamoto et al. | 204/159.14 |
| 4,134,810 | 1/1979 | Araki et al. | 524/458 X |
| 4,138,382 | 2/1979 | Polmanteer | 524/458 X |
| 4,139,437 | 2/1979 | Araki et al. | 524/458 X |
| 4,172,066 | 10/1979 | Zweigle et al. | 526/303 X |
| 4,304,705 | 12/1981 | Heilmann et al. | 524/530 |
| 4,367,323 | 1/1983 | Kitamura et al. | 524/460 X |
| 4,559,382 | 12/1985 | Martens et al. | 524/529 X |
| 4,575,539 | 3/1986 | De Crosta et al. | 524/458 |
| 4,640,954 | 2/1987 | Schnee et al. | 524/460 X |
| 4,749,506 | 6/1988 | Kitahara et al. | 524/458 X |
| 4,806,434 | 2/1989 | Ogawa | 524/458 X |
| 4,829,120 | 5/1989 | Yabuta | 524/460 |
| 4,959,178 | 9/1990 | Frentzel et al. | 524/530 X |
| 5,166,248 | 11/1992 | Kissel | 524/458 X |

FOREIGN PATENT DOCUMENTS

| 0311566A2 | 4/1989 | European Pat. Off. . |
|---|---|---|
| 2658643 | 7/1977 | Germany . |
| 3522078A1 | 1/1987 | Germany . |
| 9316261 | 3/1994 | Germany . |
| 2121421 | 12/1983 | United Kingdom . |

*Primary Examiner*—Judy M. Reddick
*Attorney, Agent, or Firm*—Oblon, Spivak, McClelland, Maier & Neustadt, P.C.

[57] ABSTRACT

Gels for thermotropic layers, obtainable by irradiation of a mixture comprising a) an uncrosslinked polymer, b) monomers capable of free-radical polymerization and c) water or an organic solvent or mixtures thereof, with high-energy light.

7 Claims, No Drawings

GELS WITH THERMOTROPIC PROPERTIES

The present invention relates to gels for thermotropic layers, obtainable by irradiation of a mixture comprising a) an uncrosslinked polymer, b) monomers capable of free-radical polymerization and c) water or an organic solvent or mixtures thereof, with high-energy light.

The present invention further relates to a process for preparing the gels and to the use thereof for producing thermotropic layers.

The need for economic use of energy and the utilization of the sun's energy to heat buildings require highly efficient and intelligent systems to adapt the solar energy systems (windows, collectors, building facades) optimally to the weather conditions and requirements of the users. A high-quality window in an office facade ensures pleasant temperatures in winter and thus leads to energy savings. In spring at the latest, the same window will lead to overheating and thus costs for cooling which cancel out the energy saving in the winter. It is therefore obvious that mechanisms to control the radiation or heat flux are needed in optimized systems. This control can take place partly passively, such as shading by roofs or balconies, or actively by mechanical roller or awning systems. However, many of these systems are not efficient enough, too costly or have inadequate durability, which in turn increases expenditure.

The idea of using electro- or thermooptical systems for control is repeatedly suggested but has not to date led to the crucial breakthrough because of problems with material or systems.

An efficient and low-cost method to control the radiation and heat flux comprises using thermotropic layers. These layers are transparent in the unswitched state and become cloudy only above a particular switching temperature. The cloudiness is completely reversible, ie. the thermotropic layers become completely transparent again on cooling below the switching temperature.

Gels used in thermotropic layers are described, for example, in DE-A-2658643 and DE-A-3522078.

DE-A-2658643 relates to a glazing system with changeable transparency. It comprises a gel which is composed predominantly of a copolymer of acrylamide and methylolacrylamide and which polymerizes at room temperature. A thermosensitive substance such as polyvinyl methyl ether or polyvinylcaprolactam is embedded in the gel. One disadvantage of this process is the preparation of the gel by polymerization in the presence of free-radial initiators, in which case the pot lives in which the composition can be applied are only very short (10 minutes).

DE-A-3522078 describes the preparation of gels with temperature-dependent transmission of light for use in constructional elements. The gel is based on a carboxyvinyl polymer which is thickened with addition of bases and then forms a gel-like composition. Polyether compounds are embedded in this composition and cause the clouding when the temperature rises. The disadvantages of this system are, in particular, that the carboxyvinyl polymer is not chemically crosslinked and therefore macroscopic phase-separation processes may occur. These phase-separation processes have the effect that either the layer no longer becomes sufficiently cloudy when the temperature rises or the clouding is no longer sufficiently reversible. In addition, the layers composed of these gels have a relatively poor switching contrast.

EP-A-311566 discloses hydrogels with thermotropic properties based on copolymers of N,N-dimethylacrylamide and alkyl acrylates, which are prepared, for example, by irradiation with high-energy light.

Thermotropic layers disclosed to date and prepared using gels still have a number of disadvantages. In particular, the long-term stability of the transparent/cloudy switching process is deficient. It is desirable that even after many repetitions of the switching process the difference in transparency remains large and the switching temperature range remains as narrow as possible. In addition, in many cases the difference in transparency above and below the switching range is not large enough. In this connection, it is particularly desirable to have maximum transparency in the homogeneous state, ie. below the switching temperature.

The switching time, ie. the time the thermotropic system takes to adjust to changes in external temperatures, is generally inadequate.

Furthermore, there is a need for processes for producing thermotropic layers of maximum homogeneity below the switching range and having no optical inhomogeneities.

It is an object of the present invention to find a gel for thermotropic layers and a process for preparing it to remedy the above-mentioned disadvantages.

We have found that this object is achieved by the gel defined at the outset, a process for its preparation and its use for producing thermotropic layers.

Gels according to the invention can be obtained by irradiation of a mixture comprising components a), b) and c) with high-energy light.

Particularly suitable as component a) are uncrosslinked polymers which have thermotropic properties such that a 10% by weight solution of this polymer in chosen solvent c), ie. in water or an organic solvent or mixtures thereof, shows, in a switching range covering less than 20° C., a change in the transmission of light at a wavelength of 600 nm and at a path length of 10 nm such that less than 50% of the incident light is transmitted above the switching range and at least 70% of the incident light is transmitted below the switching range. (In measurements with increasing or decreasing temperature to determine the transmission, in each case it is waited until the polymer or the gel has reached the newly set temperature.

The switching range or the switching temperature is preferably in the range from 20 to 90, particularly preferably from 20° to 50, ° C. and, in the case of glazing systems, very particularly preferably in the range from 20° to 40° C.

The switching range should preferably be less than 10° C., particularly preferably less than 5° C. and very particularly preferably only 1° C. or less.

The transmission is preferably at least 90% below the switching range and preferably less than 30% above it.

The thermotropic properties of the polymer are preferably caused by a limited solubility of the polymer in the chosen solvent or mixture thereof.

The temperature above which the polymers have only a limited solubility is generally called the lower critical solution temperature (LCST) or the cloud point. Below the LCST the polymers are substantially soluble in the chosen amount in the solvent; above the LCST solutions of these polymers form a multiphase system which is composed of at least one polymer-rich phase and one polymer-poor phase. Moreover, the solvent of the polymer-poor phase contains less than 50% of the polymer originally dissolved in the solvent. The polymer-rich phase predominantly contains polymer but may also contain solvent entrapped in the polymer or solvent attached to the polymer (eg. water of hydration).

Examples of suitable polymers a) are free-radical polymers, polycondensates or polyadducts, eg. polyoxymethylene.

Polymer a) is preferably a free-radical polymer and is preferably composed, for example, of the following monomers:

60–100, in particular 90–100, % by weight of monomers A

0–20, in particular 0–10, % by weight of crosslinking monomers B

0–20% by weight of other monomers C.

If water is used as solvent c) or as main constituent of the solvent (more than 50% by weight of the solvent mixture), examples of suitable monomers A are N-substituted, ethylenically unsaturated lactams (substituted and unsubstituted N-vinylcaprolactams, N-vinylpyrrolidones, N-vinyloxazolidinones, N-vinylpiperidones, N-vinylsuccinimides, N-vinylmorpholinones, N-vinylbutyrolactam, N-vinylvalerolactam, N-vinylcapryllactam, N-vinylhexahydrophthalimide, N-vinylmethyloxazolidone, N-vinylethyloxazolidone). N-Vinyl-2-caprolactam and N-vinyl-2-pyrrolidone are particularly preferred.

Also suitable are N,N'-divinylimidazolidone and N-vinylsuccinimide.

Unsubstituted or N-substituted acrylamides or methacrylamides are equally suitable.

Also suitable are hydroxyalkyl esters of unsaturated carboxylic acids such as acrylic acid, methacrylic acid and itaconic acid. The hydroxyalkyl group preferably has 2–5 carbon atoms. Examples of suitable monomers are hydroxyethyl acrylate, hydroxyethyl methacrylate, hydroxypropyl acrylate, hydroxypropyl methacrylate and hydroxybutyl acrylate.

Unsubstituted or N-substituted acrylamides or methacrylamides are also suitable. Examples of these are N-(2-hydroxyethyl)acrylamide, N-methylolacrylamide, acrylamidoglycolic acid, N-butoxymethylacrylamide, N-methoxymethylacrylamide, N-methoxymethylmethacrylamide; N,N-dialkylacrylamides with $C_1$–$C_3$-alkyl groups such as N,N-diethylacrylamide, N,N-dimethylacrylamide, N-alkylacrylamides with $C_1$–$C_6$-alkyl groups such as N-ethylacrylamide, N-isopropylacrylamide and N-propylacrylamide.

Also suitable as monomers A are vinyl ethers of the formula I

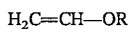

or hydrophilic vinyl ethers of the formula II

where R is $C_1$–$C_{20}$-alkyl and $R^1$ is an aliphatic or cycloaliphatic radical which can be substituted by hydroxyl groups or can be interrupted by non-adjacent —Y—groups, Y is oxygen, sulfur, $NR^2$ or $N+R^2R^3X^-$ where $R^2$ and $R^3$ are each, independently of one another, hydrogen or $C_1$–$C_4$-alkyl, and $X^-$ is a counter anion and the molar ratio of carbon atoms to the total of Y groups and hydroxyl groups in the aliphatic or cycloaliphatic radical $R^1$ is from 1.01:1 to 6.5:1.

Vinyl ethers of the formula I which should be particularly mentioned are $C_1$–$C_4$-alkylvinyl ethers, eg. methyl vinyl ether, ethyl vinyl ether, propyl vinyl ether, isopropyl vinyl ether, n-butyl vinyl ether, isobutyl vinyl ether and, for example, dodecyl vinyl ether.

Methyl vinyl ether is particularly preferred.

—Y— in vinyl ethers of the formula II is preferably oxygen.

Vinyl ethers of the formula I or II can be used as monomers A, for example, alone or mixed with one another, the mixture preferably comprising 40–100% by weight of vinyl ether I and 0–60% by weight of vinyl ether II.

If polymer a) is also to be crosslinkable, it is also possible to copolymerize monomers B which can bring about covalent cross-linking of the polymer chains during or after the polymerization.

Possible monomers B are doubly or multiply ethylenically unsaturated compounds such as methylenebisacrylamide, poly(ethylene oxide) diacrylates and dimethacrylates; poly(propylene oxide) diacrylates, etc.

Suitable monomers B may also be ethylenically unsaturated compounds able to undergo addition reactions with themselves or other groups which are present on exposure to radiation such as UV. Examples of such monomers are cinnamic acid glycidyl methacrylate, furylacrylic acid glycidyl methacrylate; 4-acryloyloxybutyl cinnamate; 2-acryloyloxyethyl cinnamate; 2-acryloyloxy-1-hydroxyethyl cinnamate, 4-acryloyloxybutyl furylacrylate; 2-acryloyloxyethyl furylacrylate; 2-acryloyloxy-1-hydroxyethyl furylacrylate etc.

Also suitable are coumarin derivatives as described, for example, in Macromolecules 23 (1990) 2693–2697 or p-formylstyrene derivatives as described in J. Polym. Sci. Polym. Chem. Ed. 20 (1982) 1419–1432.

The presence of monomers C is generally unnecessary and is therefore not preferred.

Polymer a) is particularly preferably composed essentially only of monomers A and does not contain any crosslinking monomers B.

Polymer a) is therefore preferably uncrosslinked before and after the irradiation with high-energy light.

Very particularly preferred polymers a) are poly-N-vinylcaprolactam, copolymers of N-vinylcaprolactam with at least 20% by weight of N-vinylcaprolactam and polyvinyl ether homo- or copolymers.

Besides polymers a), the mixture contains monomers b) capable of free-radical polymerization.

Monomers b) form after irradiation with high-energy light a three-dimensional network, ie. a gel which is scarcely soluble, if at all, in the chosen solvent or mixture thereof. The network formed from monomers b) preferably has no thermotropic properties or, at the most, has a switching range which is at least 20° C. above the switching range of polymer a). Any existing switching range is preferably above the boiling point of the chosen solvent or mixture thereof under atmospheric pressure (1 bar).

The monomers b) are preferably capable of free-radical polymerization. An example of a suitable monomer mixture is one composed of 70–99.9% by weight, preferably 85–96% by weight, of monomers D capable of free-radical polymerization but not crosslinking and 0.1–30% by weight, preferably 4–15% by weight, of cross-linkable monomers E Examples of suitable monomers D are vinyl esters of carboxylic acids containing 1–20 carbon atoms which can after polymerization be partially or, preferably, completely hydrolyzed to vinyl alcohols, (meth)acrylamide, (meth)acrylic acid, N-substituted (meth)acrylamides, or hydrophilic vinyl ethers of the formula II. Also suitable are (meth)acrylates containing hydroxyl groups, such as $C_1$–$C_{20}$-hydroxyalkyl (meth) acrylates, or N-methylolmethacrylamide.

Suitable crosslinking monomers E are those which contain at least 2 copolymerizable ethylenically unsaturated groups or at least one ethylenically unsaturated group and at least another reactive group capable, for example, of condensation reactions.

Examples which may be mentioned are monomers with 2 or more acryloyl groups such as poly(ethylene oxide) diacrylate and methylenebisacrylamide.

Suitable solvents c) as constituent of the mixture are, for example, glycols such as ethylene glycol, propylene glycol, diethylene glycol, dipropylene glycol, glycol ethers such as glycol methyl ether, diethylene glycol mono- and diethers, and water.

Preference is given to water as solvent or a solvent mixture which contains at least 60% by weight, preferably 90% by weight, of water, based on the solvent mixture.

The combination of water with one of the abovementioned solvents has the advantage that the low-temperature stability of the gels is increased. The thermotropic layers are intended to remain in the applications in winter too. They are moreover intended to carry out the same function as in summer. It is therefore necessary to stabilize the gels against freezing. This is necessary because the freezing water may cause permanent damage to the gel or to the entire system (ie. gel and support structure). The freezing point of the gel is lowered by adding glycols, glycol ethers or alcohols with lower alkyl chains. The same effect can also be achieved if the solvent contains soluble salts. However, care must be taken that the salts are compatible with the polymer system and, moreover, do not have an adverse effect on the switching temperature. The amount of agent needed to lower the freezing point depends on the temperature of the surroundings in which the thermotropic layer is used.

The mixtures defined at the outset may, besides components a), b) and c), also contain other constituents.

The thermotropic layers composed of gels can be stabilized against bacterial attack to ensure long-term utilizability. It is therefore sensible to add biocides to the mixtures. This can take place either by organic compounds such as formaldehyde or 1,2-benzisothiazolone or inorganic compounds such as sodium fluoride. The amount of biocide depends on the application (accessibility by microorganisms) and the activity of the biocide. The fundamentals of biocide stabilization are described, for example, in Farbe und Lacke 82 (1976) 108 et seq., Farbe und Lacke 99 (1993) 105 et seq. or in the Lehrbuch der pharmazeutischen Chemie (W. Schmack, K. Mayer, M. Haake; Verlag Vieweg und Sohn, Braunschweig 1983, eg. page 537 et seq.).

Furthermore, photoinitiators for the free-radical polymerization are preferably added to the mixtures. Suitable amounts are from 0.01 to 5%, particularly preferably 0.03 to 3% of the weight of the monomers b) capable of free-radical polymerization.

A general review of suitable photoinitiators is to be found, for example, in the article by H. F. Gruber in Prog. Polym. Sci. 17 (1992) 953 et seq.

Particularly suitable compounds for preparing hydrogels with water as solvent are water-soluble benzophenone derivatives (J. Appl. Polym. Sci. 32 (1986) 6209–26, Polym. Paint Colour J. 179 (1989) 684–687, Polym. Paint Resin 175 (1985) 246–251), sulfonated aromatic ketones (Eur. Polym. J. 27 (1991) 69–75, water-soluble thioxanthone derivatives (J. Appl. Polym. Sci. 34 (1987) 477–488) such as 4-benzoyl-N,N-dimethyl-N-(2-oxo-2-propenyloxy)ethylbenzenemethanaminium bromide, 4-benzoyl-N,N,N-tri- methylbenzenemethanaminium chloride, 4-(3-dimethylamino-2-(hydroxypropoxy)benzophenone methochloride, 2-(3-dimethylamino- 2-hydroxypropoxy)-3,4-dimethyl-9H-thioxanthen-9-one methochloride.

The mixture defined at the outset preferably comprises

5–40% by weight, particularly preferably 10–20% by weight, of the uncrosslinked polymer a), 1–30% by weight, particularly preferably 3–10% by weight, of monomers b) capable of free-radical polymerization and 30–94% by weight, particularly preferably 70–87% by weight, of water, organic solvents or mixtures thereof.

The mixture can be prepared in a straightforward manner by mixing the components and homogenizing, eg. by stirring.

The gel can then be prepared preferably directly in the appliance intended for the thermotropic layer.

For this purpose, the mixture is introduced into this appliance, eg. a glazing system, and irradiated with high-energy light.

However, the irradiation may also take place beforehand, and the resulting gel subsequently introduced into the appropriate appliance.

The monomers b) polymerize and crosslink on irradiation so that they form a three-dimensional network or a gel which contains the, preferably, uncrosslinked polymer a) and the solvent c), with or without other additives.

The radiation preferably takes place with UV light or electron beams.

The irradiation is preferably carried out until the monomers b) have formed a gel with a swelling index of, preferably, 2–500, particularly preferably 10–400, very particularly preferably 10–100 and, in particular, 20–50. The swelling index is defined as the quotient of the total amount of solvent absorbed and the mass of monomers b) used.

The irradiation preferably takes place at a temperature of at least 5° C., particularly preferably at least 10° C., very particularly preferably at least 20° C. below the switching range or below the cloud point as the lower temperature limit of the switching range.

The gels according to the invention are suitable for producing thermotropic layers which meet the conditions described at the outset for polymer a) in respect of switching range and transparency change.

At the same time, the gels show a high transparency in the homogeneous state, ie. below the switching range. Even after many repetitions of the switching process, the transparency difference remains large and the switching range remains narrow. The low switching time is also advantageous.

The gels according to the invention are therefore particularly suitable for producing glazing systems with thermotropic properties and for producing building components for thermal insulation.

EXAMPLES

Preparation of polymers a)
Poly-N-vinylcaprolactam (A)

The following were introduced with stirring into a heated polymerization vessel with: 200 g of water, 500 g of methanol, 600 g of N-vinylcaprolactam and 3 g of 2,2'-azobis(2-methylbutyronitrile). The container was heated to 85° C. and then polymerized for 4 h. Subsequently the polymer was cooled to 25° C., 700 g of water were added over the course of 3 h, and the mixture was stirred until homogeneous.

Subsequently 1000 g of the polymer were heated to 50° C. with stirring, and methanol was distilled out under 100 mbar over the course of 2 h. 500 g of water were added during the distillation.

The result was a colorless aqueous polymer solution with a solids content of 20% (=polymer A).

The cloud point of a 10% strength solution of the polymer in water was found to be 32° C.

N-Vinylcaprolactam copolymer (B):

The following were introduced with stirring into a heated polymerization vessel: 200 g of water, 500 g of methanol, 350 g of N-vinylcaprolactam, 250 g of N-vinylpyrrolidone and 3 g of 2,2'-azobis(2-methylbutyronitrile). The container was heated to 85° C. and then polymerized for 4 h. Subsequently the polymer was cooled to 25° C., 700 g of water were added over the course of 3 h, and the mixture was stirred until homogeneous.

Subsequently 1000 g of the polymer were heated to 50° C. with stirring, and methanol was distilled out under 100 mbar over the course of 2 h. 500 g of water were added during the distillation.

The result was a colorless aqueous polymer solution with a solids content of 20% (=polymer B).

The cloud point of a 10% strength solution of the polymer in water was found to be 52° C.

Polyvinyl ether copolymer (C):

300 g of a mixture of 1275 g of vinyl methyl ether and 225 g of methyltriethylene glycol vinyl ether were introduced into a reaction vessel with heating bath, stirrer, dry ice condenser and addition vessels, and the reaction vessel was heated to an external temperature of 30° C.

0.62 ml of a 3% strength solution of boron trifluoride dihydrate in dioxane was added in 3 portions over the course of 15 min. After the reaction started, the remaining 1200 g of monomer mixture and 0.92 ml of a 3% strength solution of boron trifluoride dihydrate in dioxane and 1.25 ml of a 1% strength solution of oxalic acid in dioxane were added continuously over the course of 5 hours.

After the additions were complete, the reaction mixture was heated to 70° C. and polymerization was continued for 30 min. Subsequently the pressure was reduced to 20 mbar for 1 hour and unreacted monomer was stripped off. 1450 g of product were obtained.

A 10% strength aqueous solution of the polymer had a cloud point of 33° C. (=solution of polymer C).

Crosslinkable polyvinyl ether copolymer (D):

150 g of a mixture of 585 g of vinyl methyl ether and 150 g of methyltriethylene glycol vinyl ether, 15 g of vinyloxybutyl acrylate and 0.1 g of 2,6-di-tert-butyl-p-cresol were introduced into a reaction vessel with heating bath, stirrer, dry ice condenser and addition vessels, and the reaction vessel was heated to an external temperature of 30° C.

0.50 ml of a 3% strength solution of boron trifluoride dihydrate in dioxane was added in 3 portions over the course of 15 min. After the reaction started, the remaining 600 g of the monomer mixture and 0.80 ml of a 3% strength solution of boron trifluoride dihydrate in dioxane and 0.80 ml of a 1% strength solution of oxalic acid in dioxane were added continuously over the course of 4 hours.

After the additions were complete, the reaction mixture was heated to 50° C. and polymerization was continued for 30 min. Subsequently the pressure was reduced to 20 mbar for 1 hour and unreacted monomer was stripped off. 700 g of product were obtained.

A 10% strength aqueous solution of the polymer had a cloud point of 35° C. (=solution of polymer D).

Production of hydrogels by UV crosslinking:

The components of the hydrogel were mixed in the amounts indicated in Table 1–3. The mixture was sucked through a filter of pore width 5 μm and degassed under a water pump vacuum at room temperature for 30 min.

To produce the gel, a polyacrylate cuvette (1 cm path length) was filled with the mixture, closed and irradiated at the temperature indicated in the table for 30 min. A UV flat illuminator with a spectral range of 290–450 nm was used for this.

The hydrogels were characterized as follows:

1. Measurement of the cloud point and determination of suitability for glazing:

To determine the transparency, the samples were measured with a light transmission apparatus at 20° C. The apparatus essentially comprises a point light source and a photocell. The photocurrent delivered by the photocell serves as a measure of the intensity of the light passing through. A heatable sample holder is present in the ray path between light source and photocell. A cuvette filled with distilled water served as reference. Samples which are particularly suitable for glazing have a transparency T1 of at least 85% at 20° C. and a path length of 10 mm. (Tables)

The cloud point is determined from the decrease in transparency of a sample as the temperature is raised. The sample is heated at 1 K/min and the intensity of a light beam passing through the sample is measured. The cloud point CP is defined as the temperature at which the transparency of the sample is only 50% of the value measured at 20° C.

2. Test of reversibility

A sample is heated, starting from 20° C., at 1 K/min to a temperature 10° C. above the previously measured cloud point (CP+10° C.). After a maintenance time of 1–10 min, the sample is then cooled at 1 K/min to 20° C., and the intensity is measured. Particularly suitable samples show a transparency T2 after cooling of at least 80–90% of the original transparency T1 at 20° C.

3. Test of long-term stability

A sample is heated, starting from 20° C., at 1 K/min to a temperature of 10° C. above the cloud point CP and kept at this temperature for 5 hours. The sample is then cooled at 1 K/min to 20° C. Particularly suitable samples then show a transparency T3 of at least 70% of the original transparency T1 at 20° C. In addition, the appearance of the sample during the maintenance time should show no essential change, ie. no inhomogeneities or phase separations should occur. The appearance of the sample after the cooling should not visibly differ from the initial sample.

4. Production of a model window

A mixture to prepare the hydrogel was placed in the space between the panes of a model window. The model window consisted of a pane of window glass and a second pane of acrylic glass or quartz glass through which it was possible to illuminate the gel with a UV flat-bed illuminator. The space between the panes was, as a rule, 2 mm. After filling, the window was irradiated at a suitable crosslinking temperature for 30 min, and the appearance of the hydrogel-filled pane was assessed. Particularly suitable hydrogels showed no optical or other inhomogeneities (indicated by + in the tables).

Tables 1 to 3 show the results of the characterization of the hydrogels by tests 1 to 4 above.

Hydrogels composed of polymer A–D with acrylamide/MBAM

| No. | Polymer (g/20% solution) | | AM (g 50% solution) | MBAM (g 5% solution) | Photocross-linker (g 5% solution) | | Illumination temperature | CP/°C. | T1/% | T2/% | T3/% | Model window | Notes |
|---|---|---|---|---|---|---|---|---|---|---|---|---|---|
| 1 | A | 25 | 4.75 | 6.25 | Pl-1 | 0.75 | <10 | 28 | 96 | 95 | 90 | + | |
| 2 | A | 25 | 4.75 | 6.25 | Pl-2 | 0.75 | <10 | 28 | 93 | 90 | 89 | + | |
| 3 | B | 25 | 4.75 | 6.25 | Pl-1 | 0.75 | <25 | 50 | 91 | 90 | 87 | + | |
| 4 | B | 25 | 4.75 | 6.25 | Pl-2 | 0.75 | <25 | 50 | 89 | 85 | 85 | + | |
| 5 | C | 25 | 4.75 | 6.25 | Pl-1 | 0.75 | <10 | 31 | 95 | 90 | 97 | + | |
| 6 | C | 25 | 4.75 | 6.25 | Pl-2 | 0.75 | <10 | 31 | 91 | 88 | 87 | + | |
| 7 | D | 25 | 4.75 | 6.25 | Pl-1 | 0.75 | <10 | 32 | 89 | 85 | 82 | + | |
| 8 | D | 25 | 4.75 | 6.25 | Pl-2 | 0.75 | <10 | 32 | 87 | 80 | 78 | + | |
| 9 | A | 25 | 4.75 | 6.25 | Pl-1 | 0.75 | 30 | 25 | 65 | 63 | n.d. | n.d. | Cloudy from the outset |
| 10 | B | 25 | 4.75 | 6.25 | Pl-1 | 0.75 | 40 | 48 | 78 | 77 | | n.d. | Too cloudy at 20° C. |

AM: Acrylamide
MBAM: Methylenebisacrylamide
PE1550DA: Polyethylene oxide 1500 diacrylate
AA-Na: Sodium acrylate
Pl-1: 4-Benzoyl-N,N'-dimethyl-(2-(1-oxo-2-propenyloxy)ethyl)benzenemethanaminium bromide (CAS No. 125850-75-1)
Pl-2: 2-Hydroxy-3-(3,4-dimethyl-9-oxo-9H-thioxanthan-2-yloxy)-N,N,N-trimethyl-1-propanaminiumchloride (CAS No. 103430-24-6)
The mixtures were made up to 50.0 g with water

TABLE 2

Hydrogel composed of polymer A–D with AM/poly(ethylene oxide) diacrylate

| No. | Polymer (g/20% solution) | | AM (g 50% solution) | PE1500DA (g 10% solution) | Photocross-linker (g 5% solution) | | Illumination temperature | CP/°C. | T1/% | T2/% | T3/% | Model window | Notes |
|---|---|---|---|---|---|---|---|---|---|---|---|---|---|
| 11 | A | 25 | 4.5 | 6.25 | Pl-1 | 0.75 | <10 | 29 | 95 | 95 | 91 | + | |
| 12 | B | 25 | 4.5 | 6.25 | Pl-1 | 0.75 | <10 | 50 | 92 | 91 | 88 | + | |
| 13 | C | 25 | 4.5 | 6.25 | Pl-1 | 0.75 | <10 | 30 | 92 | 90 | 86 | + | |
| 14 | D | 25 | 4.5 | 6.25 | Pl-1 | 0.75 | <10 | 32 | 88 | 81 | 78 | + | |

TABLE 3

Hydrogel composed of polymer C and D with AA-Na/PE-1500DA

| No. | Polymer (g/20% solution) | | AA/Na (g 50% solution) | PE1500DA (g 10% solution) | Photocross-linker (g 5% solution) | | Illumination temperature | CP/°C. | T1/% | T2/% | T3/% | Model window | Notes |
|---|---|---|---|---|---|---|---|---|---|---|---|---|---|
| 15 | C | 25 | 4.5 | 6.25 | Pl-1 | 0.75 | <10 | 32 | 94 | 92 | 90 | + | |
| 16 | D | 25 | 4.5 | 6.25 | Pl-1 | 0.75 | <10 | 31 | 89 | 83 | 81 | + | |

Comparative examples

Use of the solutions of polymer A–D without hydrogel formation:

In each case 15% strength aqueous solutions of polymers A–D were tested for their suitability according to the invention in the long-term stability test. The polymer solutions changed markedly during the storage time. All the polymers started to coagulate after a certain time and clearly visible inhomogeneities formed. As a rule, there was phase separation into a polymer-rich phase and a polymer-poor, less cloudy aqueous phase. The cloudiness was reversible but, in some cases, it took a very long time to return to the original transparency. On heat treatment of the model panes, distinct optical inhomogeneities were to be seen after cooling and impaired the optical quality.

Hydrogel by free-radical polymerization:

2,0 g of a 5% strength solution of 2,2'-azobis(2-(2-imidazolin-2-yl)propane) dihydrochloride were added to a mixture of 25 g of solution of polymer B, 4.75 g of AM (50% strength in $H_2O$), 6.25 g of MBAM (5% strength in $H_2O$) and 11 g of water. The solution was degassed, transferred into a cuvette and subsequently heated at 40° C. for 5 h. The resulting hydrogel had only a low initial transparency T1 of 75%.

Hydrogel by redox polymerization at low temperature:

1.0 g of a 5% strength aqueous solution of ammonium persulfate is added to a mixture of 25 g of a 20% strength solution of polymer C, 4.75 g of a 50% strength aqueous solution of acrylamide, 6.25 g of a 5% strength solution of methylenebisacrylamide and 12.65 g of water, and the mixture is degassed. Subsequently 1.0 g of a 5% strength aqueous solution of tetramethylenediamine is added. A hydrogel forms within 10 min. The hydrogel had a transparency T1>90%.

An identical mixture was used in an attempt to fill a two-pane model window with a size of 30×30 and a distance of 2 mm between the panes. However, distinct inhomogeneities appeared because the gel polymerized completely before it was possible to fill the pane completely.

Hydrogel by photochemical crosslinking of polymer D:

1.0 g of a 5% strength solution of 4-benzoyl-N,N'-dimethyl-(2-(1-oxo-2-propenyloxy)ethyl)benzenemethanaminium bromide was added to 49 g of a 10% strength aqueous solution of polymer D. The mixture was filtered, degassed and irradiated for 30 min. The resulting hydrogel had a transparency T1>90% at 20° C. The cloud point of the gel was determined to be 33° C. The clouding was reversible. However, the gel shrank on heating so that inhomogeneities became visible. On determination of the long-term stability, a cloudy polymer-rich phase and a supernatant less cloudy phase formed. The gel cannot be used for the application according to the invention because of the distinctly visible inhomogeneities.

We claim:

1. A gel for thermotropic layers, obtained by irradiation of a mixture comprising
   a) an uncrosslinked polymer selected from the group consisting of poly-N-vinylcaprolactam, copolymers of N-vinylcaprolactam containing at least 20% by weight of N-vinylcaprolactam and polyvinyl ethers, said uncrosslinked polymer having thermotropic properties such that a 10% by weight solution of this polymer in water or an organic solvent or mixtures thereof brings about, in a switching range covering less than 20° C., a change in the transmission of light at a wavelength of 600 nm and at a path length of 10 mm such that less than 50% of the incident light is transmitted at temperatures above the switching range and at least 70% of the incident light is transmitted below the switching range,
   b) monomers capable of free-radical polymerization and
   c) water or an organic solvent or mixtures thereof, with high-energy light.

2. A gel as claimed in claim 1, which is a mixture comprising, based m total gel
   a) 5–40% by weight of an uncrosslinked polymer,
   b) 1–30% by weight of monomers capable of free-radical polymerization and
   c) 30–94% by weight of water or an organic solvent or mixtures thereof.

3. A gel as claimed in claim 1, wherein component c) is water.

4. A gel as claimed in claim 1, wherein the monomers b) form, after irradiation with high-energy light, a three-dimensional network which has no thermotropic property as defined in claim 1 or which has a switching range at least 20° C. above the switching range of polymer a).

5. A gel as claimed in claim 1, wherein the mixture additionally contains a photoinitiator.

6. A process for preparing gels with thermotropic properties, which comprises irradiating a mixture comprising
   a) an uncrosslinked polymer selected from the group consisting of poly-N-vinylcaprolactam, copolymers of N-vinylcaprolactam containing at least 20% by weight of N-vinylcaprolactam and polyvinyl ethers, said uncrosslinked polymer having thermotropic properties such that a 10% by weight solution of this polymer in water or an organic solvent or mixtures thereof brings about, in a switching range covering less than 20° C., a change in the transmission of light at a wavelength of 600 nm and at a path length of 10 mm such that less than 50% of the incident light is transmitted at temperatures above the switching range and at least 70% of the incident light is transmitted below the switching range,
   b) monomers capable of free-radical polymerization and
   c) water or an organic solvent or mixtures thereof, with high-energy light.

7. A gel for thermotropic layers, obtained by irradiation of a mixture comprising
   a) an uncrosslinked polymer selected from the group consisting of polyvinyl ethers, poly-N-vinylcaprolactam and copolymers of N-vinylcaprolactam containing at least 20% by weight N-vinylcaprolactam,
   b) monomers capable of free-radical polymerization and
   c) water or an organic solvent or mixtures thereof, with high-energy light.

* * * * *